Figure 1:
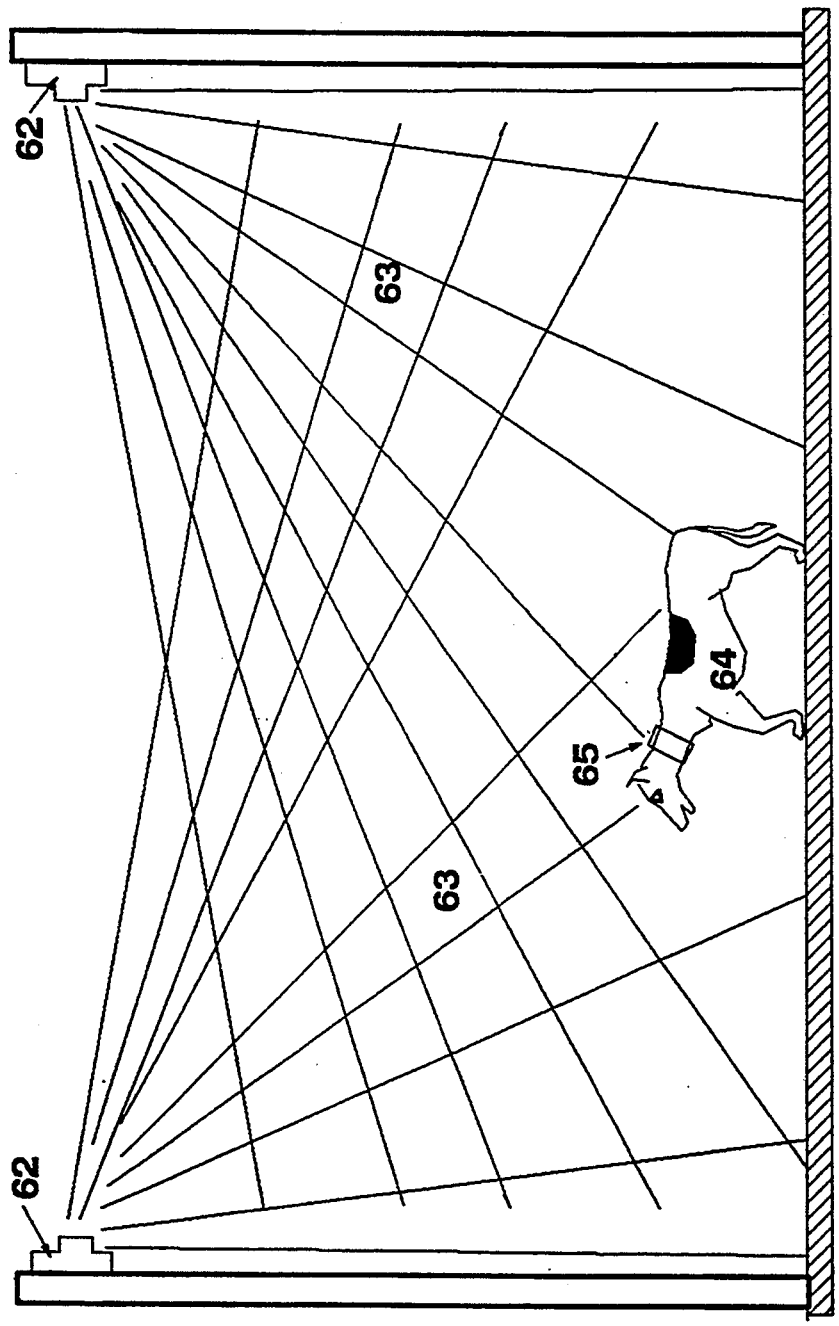

US005335626A

United States Patent [19]

Calabrese

[11] Patent Number: 5,335,626
[45] Date of Patent: Aug. 9, 1994

[54] LINEAR ENERGY CURTAIN

[76] Inventor: Frank A. Calabrese, P.O. Box 588, Waynesboro, Pa. 17268

[21] Appl. No.: 14,810

[22] Filed: Feb. 8, 1993

Related U.S. Application Data

[63] Continuation-in-part of Ser. No. 867,892, Apr. 13, 1992, abandoned, which is a continuation-in-part of Ser. No. 94,075, Sep. 4, 1987, Pat. No. 5,113,962, which is a continuation of Ser. No. 820,644, Jan. 21, 1986, abandoned.

[51] Int. Cl.$^5$ ................................................. A01K 3/00
[52] U.S. Cl. ...................................... 119/721; 119/908
[58] Field of Search ................ 119/29, 51.02; 340/573

[56] References Cited

U.S. PATENT DOCUMENTS

| 4,335,682 | 6/1982 | Gonda et al. | 119/29 |
| 4,766,847 | 8/1988 | Venczel et al. | 119/29 |
| 4,967,696 | 11/1990 | Tobias | 119/29 |
| 5,121,711 | 6/1992 | Aine | 340/573 X |
| 5,164,707 | 11/1992 | Rasmussen et al. | 340/573 X |

Primary Examiner—Robert P. Swiatek
Attorney, Agent, or Firm—Spencer T. Smith

[57] ABSTRACT

An animal confinement system is disclosed where a boundary is defined by converting energy radiated from a point source into a curtain. A code is transmitted within this curtain so that a receiver carried by an animal can receive the code and issue a suitable instruction to the animal.

11 Claims, 8 Drawing Sheets

LINEAR ENERGY CURTAIN

This is a continuation-in-part application of Ser. No. 07/867,892, filed Apr. 13, 1992, now abandoned, which was a continuation-in-part of Ser. No. 07/094,075, filed Sep.4, 1987, now U.S. Pat. No. 5,113, 962, issued May. 19, 1992, which was a continuation of Ser. No. 06/820,644, filed Jan. 21, 1986, now abandoned.

A Linear Energy Curtain is disclosed which is a static electronic energy conversion device consisting of two parts, a transmitter part and receiver part. Being static, it contains no moving parts. An electronic signal is converted into an energy signal which is focused and transmitted in form of a line. The linear energy field may be viewed as a plane or curtain of energy, which is transmitted along a linear corridor. The width, length, and even the curvature of this energy curtain may be adjusted to meet specific applications. The energy transmitted in this manner may be received by a receiver located anywhere within the aforementioned curtain (plane). The strength of the energy will decrease in intensity as the energy field extends from the focal line of the curtain.

Encoded, superimposed or integrated within the energy curtain is a communication signal, which may be a frequency, pulses, modulated frequency, modulated amplitude, etc. The complementary receiver part located anywhere within the curtain (plane) of the transmitted energy will receive the energy, and decode the encoded signal. In this fashion communication will occur between the transmitter(s) and receiver(s) located within the curtain (plane). The receiving part may be fixed or moving with respect to the transmitter part for the communication to occur.

Other objects and advantages of the present invention will become apparent from the following portion of the specification and from the following drawings which illustrate in accordance with the mandate of the patent statues presently preferred embodiment incorporating the principles of the invention.

Figure 2:
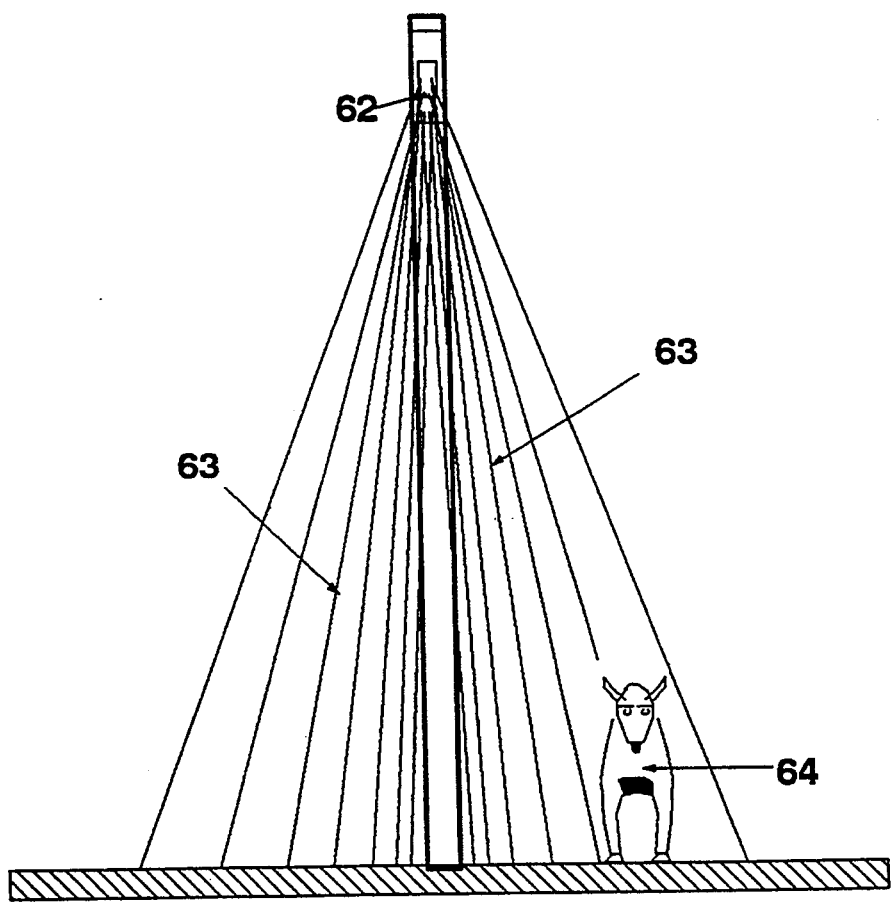
Figure 3:
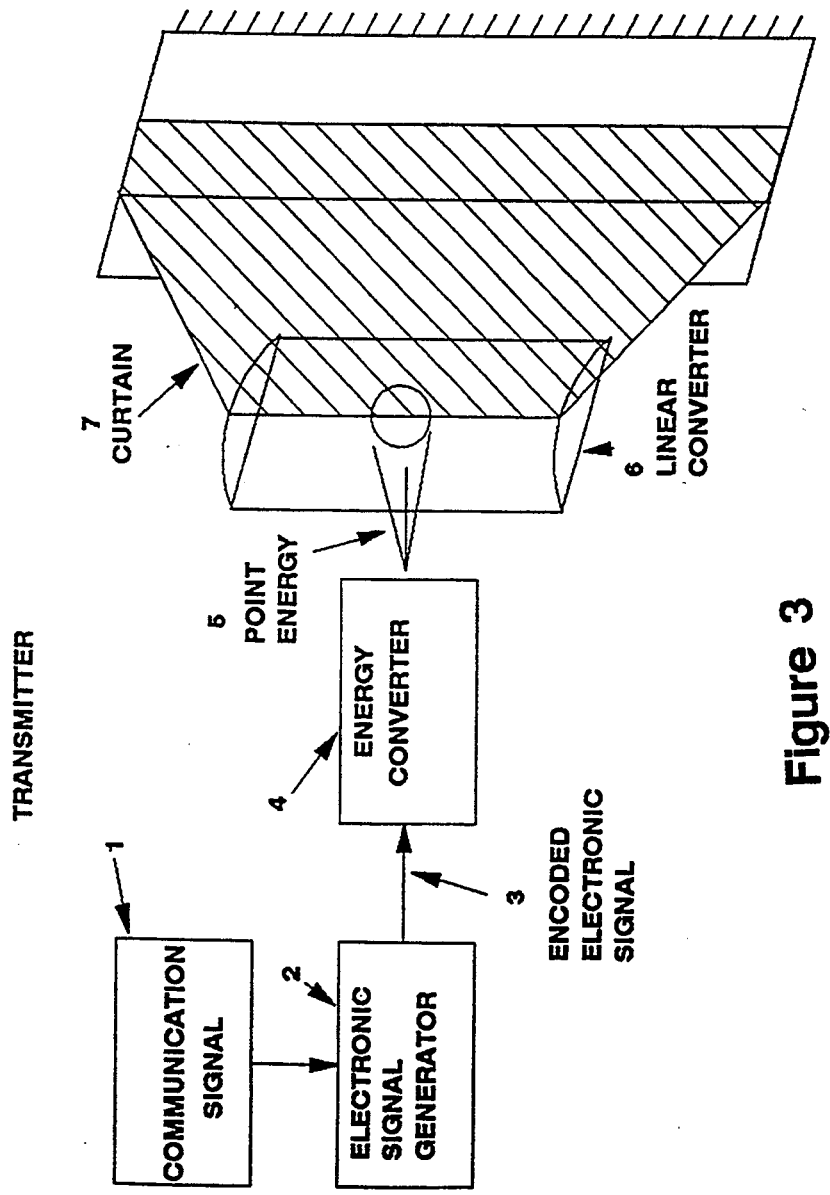

Referring to the drawings:

FIG. 1 is a side view of the Linear Energy Curtain communicator made in accordance with the teachings of the present invention, FIG. 2 is front view of the Linear Energy Curtain shown in FIG. 1, FIG. 3 is a block diagram illustrating the transmitter of the Linear Energy Curtain.

Figure 4:
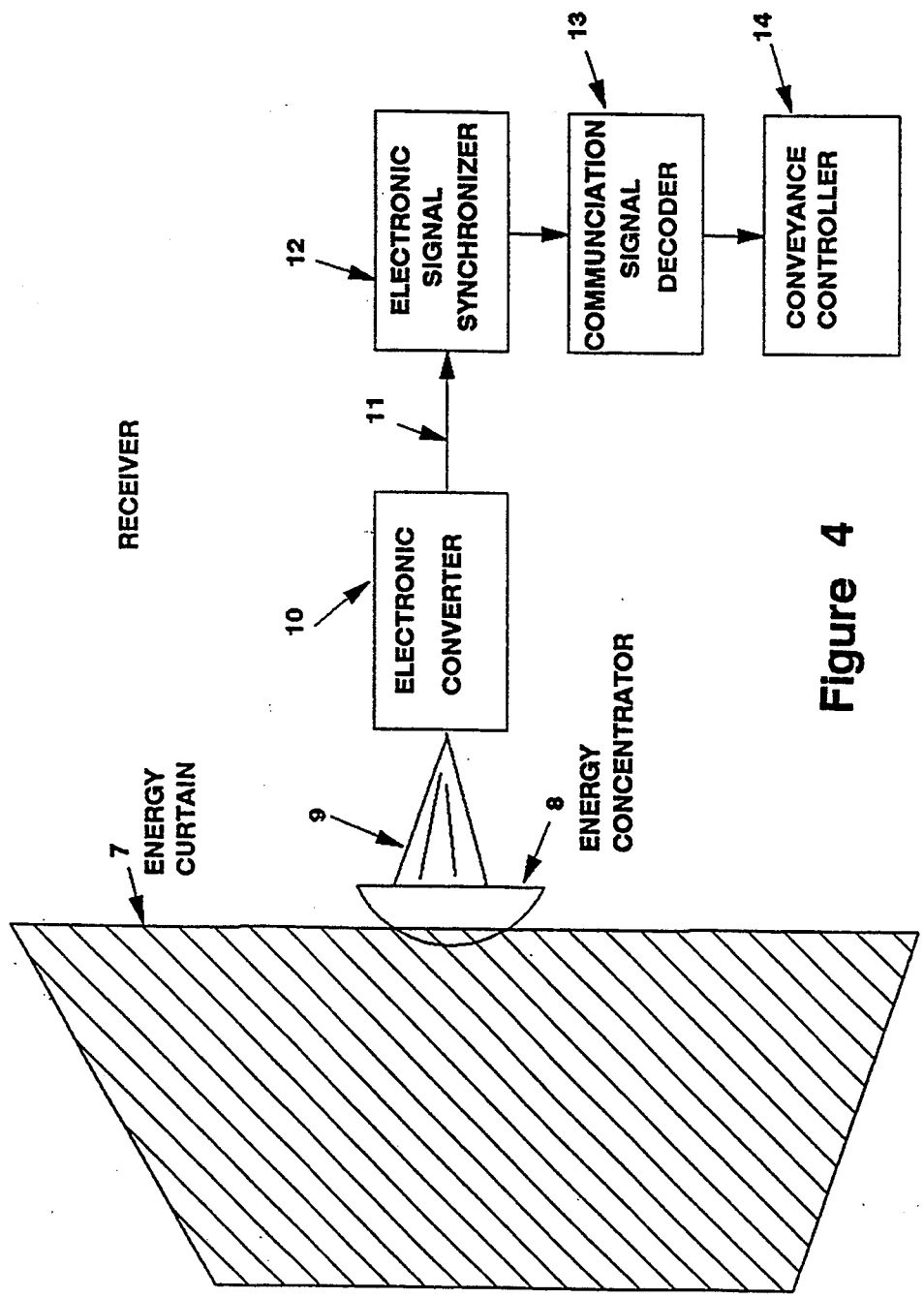
Figure 5:
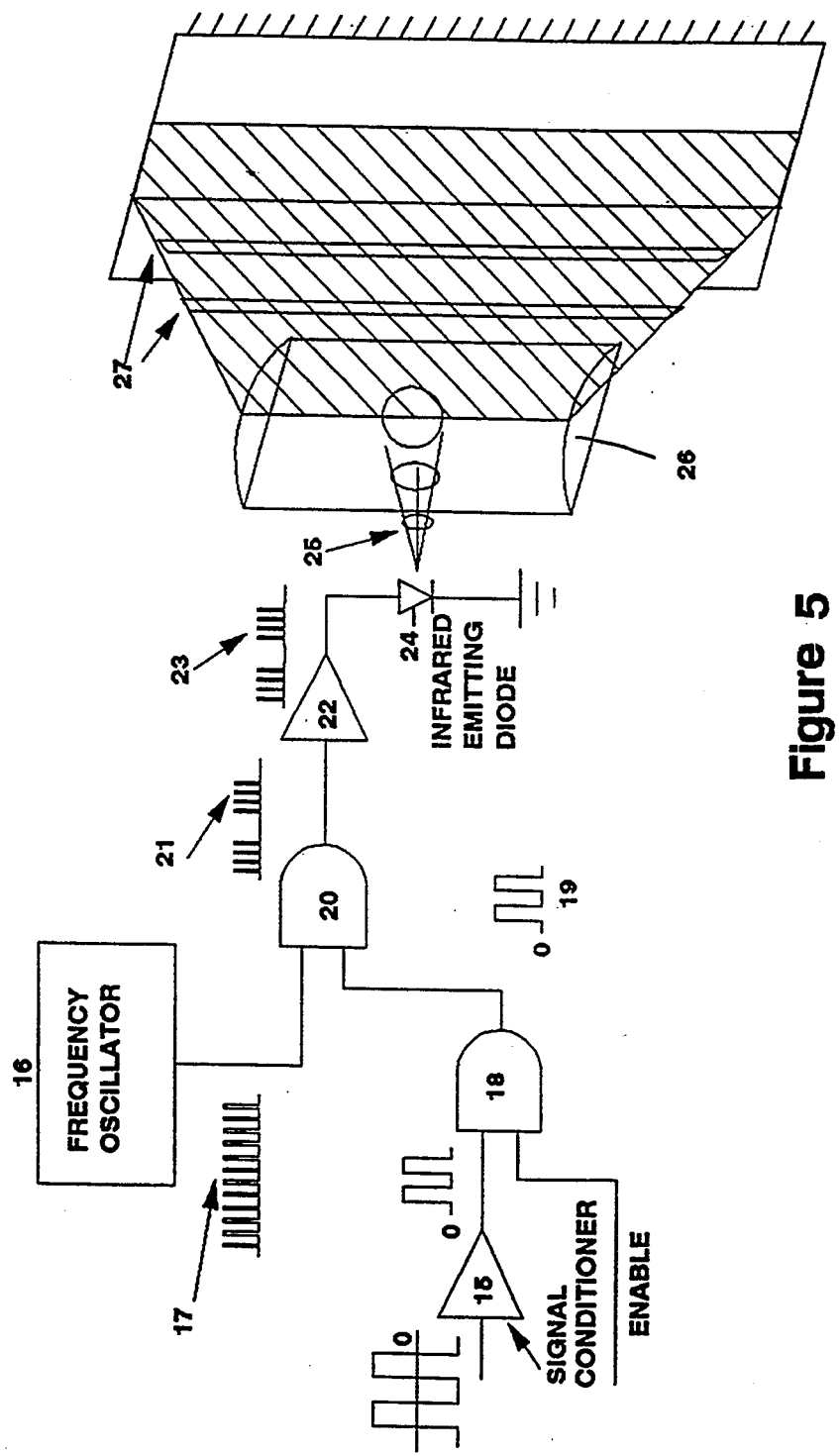
Figure 6:
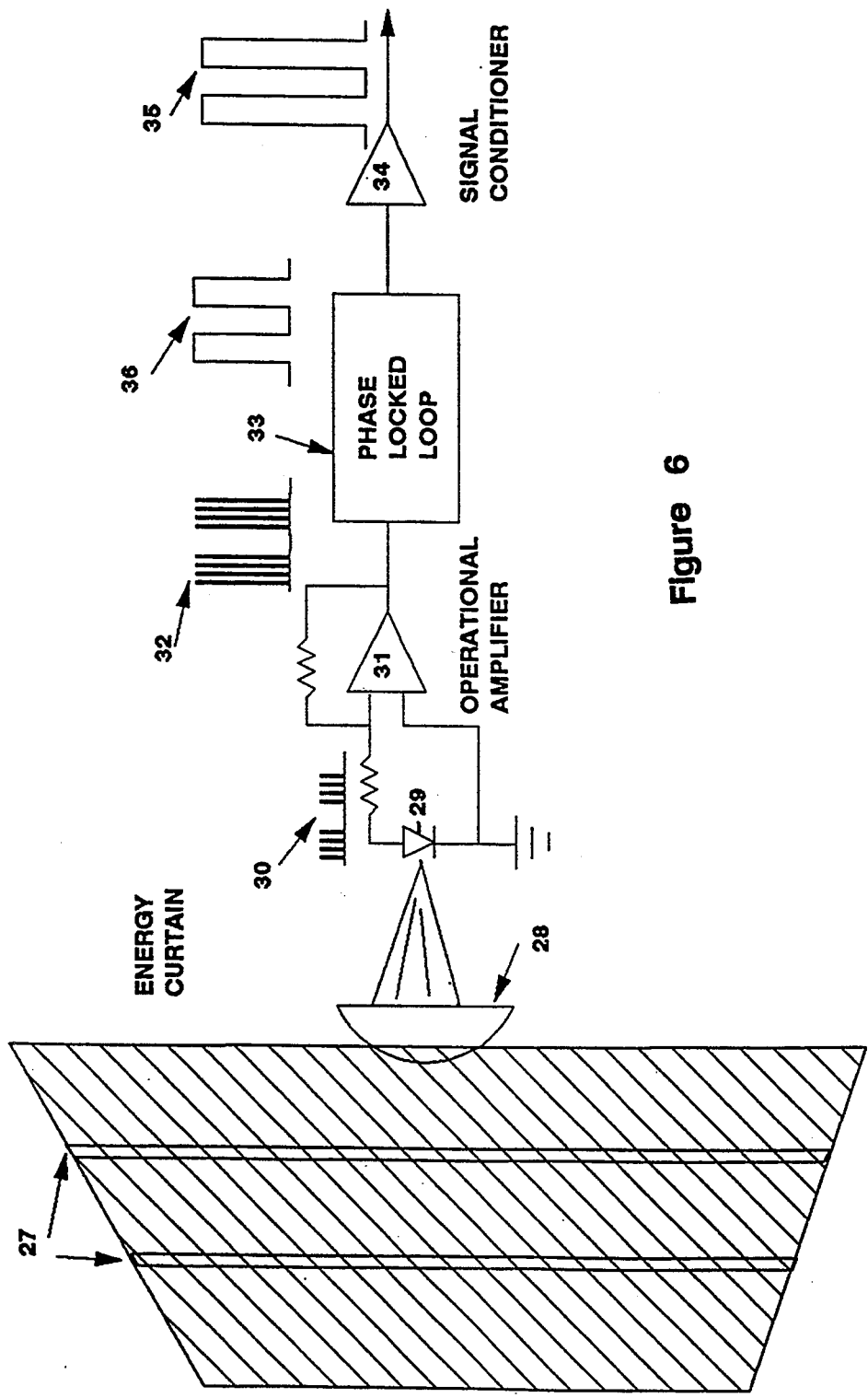
Figure 7:
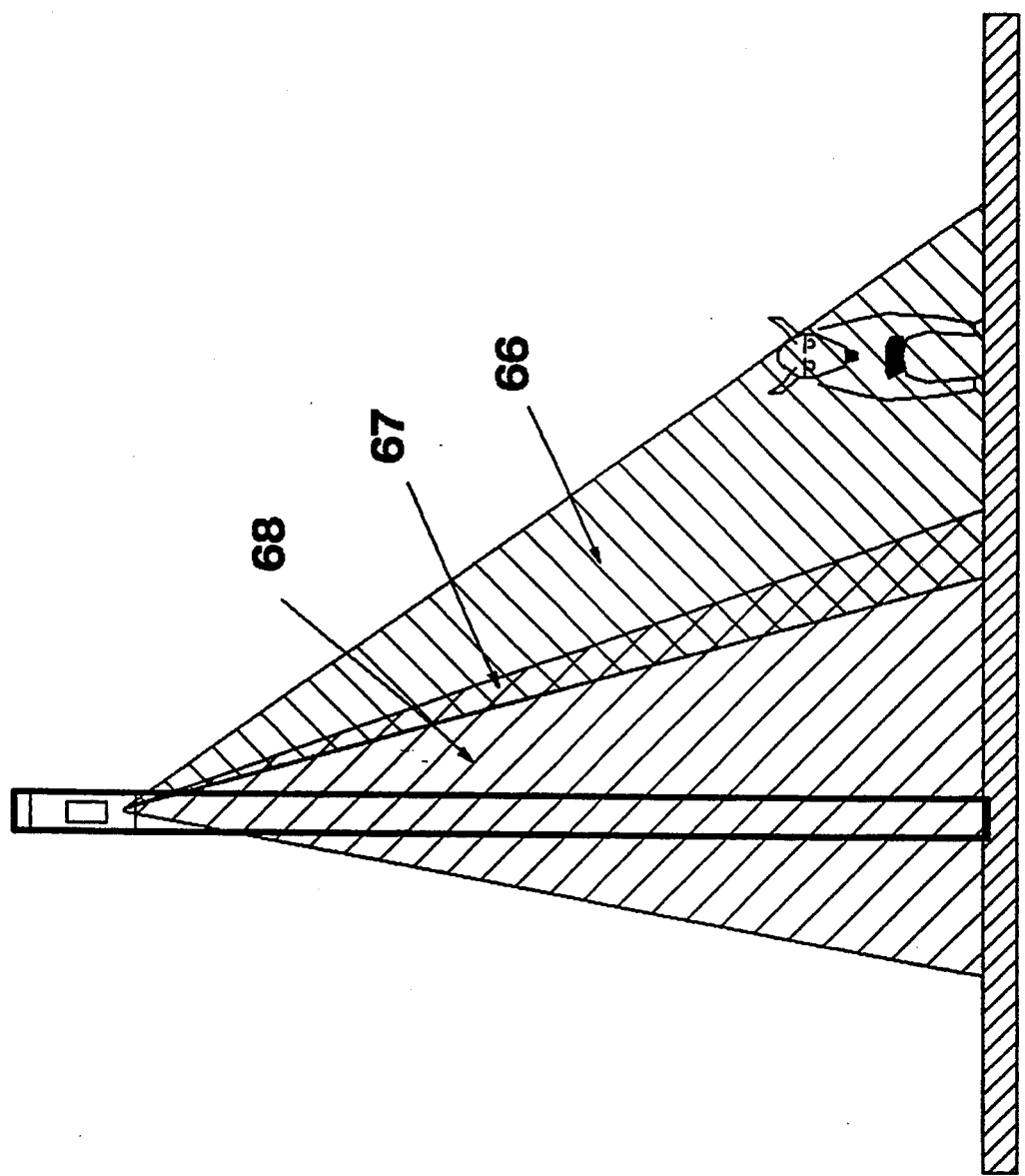
Figure 8:
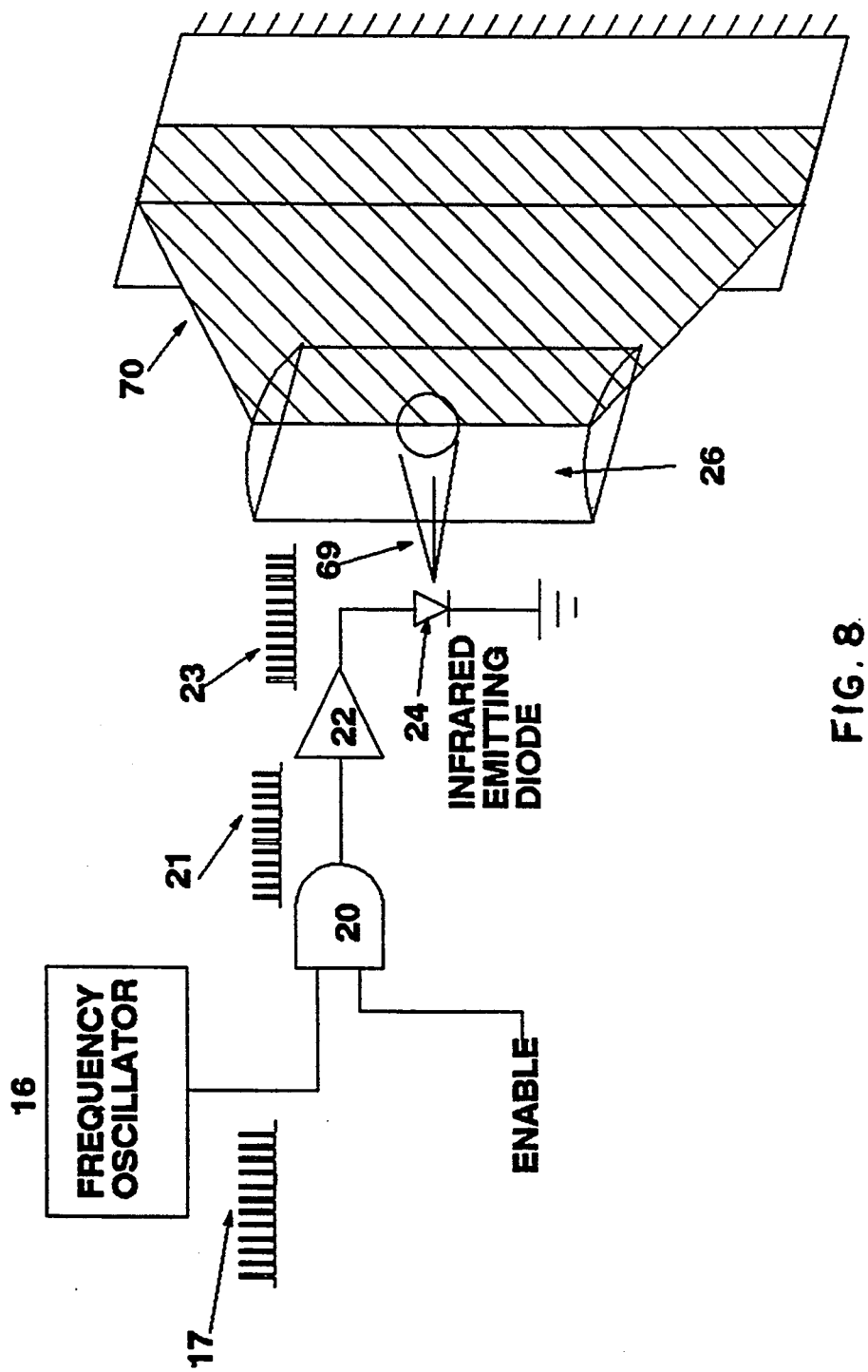

FIG. 4 is a block diagram illustrating the receiver of the Linear Energy Curtain, FIG. 5 is a block diagram of a transmitter for transmitting infrared optical energy, FIG. 6 is a block diagram for receiving infrared optical energy, FIG. 7, is a front view of the Linear Energy Curtain showing the transmission energy fields and overlapping of a plurality of two Linear Energy Curtains, and FIG. 8, is a block diagram illustrating the transmission of non coded Infrared optical energy.

An application example would consist of stationary transmitters 62 as shown in FIGS. 1 and 2. The transmitters 62 send a linear curtain of energy (decreasing in intensity from the focal line) 63, encoded with a command along a perimeter. A moving or fixed receiver 65 attached to a conveyance 64, such as a domesticated animal to be contained, receives and converts the linear energy back into an electric signal decoded to present information. The beam 63 extends a curtain along a border or boundary. The animal will be in continual communication with the transmitter so long as the animal is within the curtain of the transmitted linear beam. The communication occurs with no physical connection or wiring between the transmitter 62 and the animal 64.

Referring to FIG. 3, the block diagram of the transmitter 62, the communication signal 1 contains the information which is to be transmitted through the transmitter 62. This communication signal is integrated with the electronic signal generator 2 which results in an electronic encoded signal 3. This electronic encoded signal drives the energy converter 4, which generates a point source of encoded energy 5; this encoded energy immediately begins to disperse omni-directionally from its point source. It is now intercepted by the linear converter 6, which focuses the rapidly dispersing energy into a narrow line of encoded energy which may be directed along a prescribed curtain 7. A receiving device 65 either moving or stationary within the curtain of energy may now detect the encoded energy. This will only occur within the energy curtain. The block diagram of the receiving device, shown in FIG. 4, includes an energy concentrator 8 which will focus the linear energy into a point source 9. The point source of energy is focused onto an electronic converter 10 which converts the energy into an encoded electronic signal 11. The electronic synchronizer 12 is tuned to the electronic signal generated by the electronic signal generator 2. Upon recognizing the specified signal the signal is decoded by the communication signal decoder 13, and is transferred out to the conveyance (animal) controller, 14.

The conveyance controller will convert the signal into an instructional command to the animal. This instructional command may take several forms, such as varying audible tones, electrical shock, or other instructional instruments.

The energy utilized can be anywhere within the frequency spectrum which could include, but is not limited to, audio, visible light, laser light, infrared, microwave, etc. Certain energy frequencies are better suited for individual applications. Infrared optical energy is very well suited for this environment. As example, an infrared transmitting application is shown in FIG. 5. (Other applications can also be developed under the guides of this disclosure.)

The incoming data signal is conditioned through a signal conditioner 15, and allowed to pass through "and" gate 18 only when enabled by an external signal (switch). The data signal 19 enables the higher frequency signal 17 which was generated by the frequency oscillator 16. Data pulses of encoded frequency 21 entered the current driver 22, which provides the encoded electrical signal of sufficient current to drive the infrared emitting diode 24. This provides sufficient current to generate the infrared energy pulses 25 corresponding to the encoded electrical signal. These infrared data pulses enter the cylindrical lens 26 which converts the omni-directional energy pulsed into linear energy pulses 27. The linear energy pulses are transmitted along the direction of a defined corridor. The infrared receiver shown in FIG. 6 may be either moving or stationary within the corridor, and receives the linear energy pulses 27.

The lens 28 focuses the linear energy onto the infrared receiving diode 29. This then generates an electrical signal 30 of the encoded data. The encoded electrical signal is amplified by the operational amplifier 31 into a useable electrical signal 32 which enters the phase locked loop circuit, which is synchronized to the originally generated and transmitted frequency from the frequency oscillator 16. This circuit results in decoded pulses 36 which correspond to the original data from the signal generator 15. These decoded data pulses are conditioned by a signal conditioner 34, and the conditioned pulses are converted into instructional commands 35 to the animal.

The Linear Energy Curtain may be applied to retain animals within a prescribed boundary by judiciously locating transmitters above ground along the perimeter or the boundary. This would form a continuous curtain of invisible Linear Energy at the perimeter. Any Linear Energy Receiver entering the curtain (corridor) of the linear energy would be subject to the instructional command. The Linear Energy Curtain would transmit a continuous signal within its curtain. Several curtains would be transmitted side by side and possibly overlapping to provide different instructional commands to the animal. This is shown in FIG. 7.

In this configuration a plurality of two Linear Energy transmitters would be employed to transmit two different energy curtains containing two different codes. The Receiver located on conveyance (animal) would be capable of receiving and decoding both codes. As the animal entered the first curtain 66, this signal would be decoded, and the appropriate instructional command issued to the animal. As the animal entered the overlapping curtain's corridor 67, two codes would be received and decoded. The animal would receive a second and perhaps different instructional command. As the animal proceeded to the corridor occupied solely by the second curtain, 68, then the animal would receive an additional instructional command. The instructional commands would be selected to best deter the animal from entering the curtains.

In a similar manner, a plurality of transmitters and Linear Energy Curtains may be employed to provide a plurality of instructional commands.

The electronics within the receiver would be capable of receiving all the signals provided by the transmitters and subsequently converting these signals into the desired instructional commands. The instructional commands therefore would vary depending upon the relative position of the receiver (animal) to the boundary established by the Linear Energy Curtains.

Most types of radiated energy can be utilized for this function. However, infrared energy offers a very safe and practical frequency range for this specific requirement. Electronic signals are generated which contain the code to be transmitted. These electronic signals are converted to infrared utilizing electronic devices manufactured for the purpose. The infrared energy generated begins to disperse until it contacts the cylindrical optical lens which linearizes the energy into line which disperses into a plane or curtain. The shape and size of the curtain is established by design. The infrared energy curtain is focused onto a prescribed boundary, thus generating the linear energy only where desired. Any receiving device within the curtain only may receive the coded energy signals. These signals are decoded to provide an instructional command to the animal, warning it to remain within the prescribed boundary. This provides a new and unique method of establishing perimeter for animal control.

In addition to encoded infrared transmitted signals, the basic infrared optical energy could also be utilized as a means for establishing an invisible curtain as shown in FIG. 8. The absence and presence of the infrared energy of a specific wavelength could be detected by the receiver on the collar as an indication that the animal is within the invisible curtain field, and a subsequent instructional command could be issued to the animal.

The intensity of the field decreases as the field disperses from the lens, 26. Circuitry in the collar could be devised which would sense the change in field strength as the animal moves into and through the field towards the boundary. This change in magnitude of the field strength would be detected and an appropriate instructional command could be issued to the animal in direct relationship to the magnitude of the field strength.

Multiple fields as shown in FIGS. 5 and 8 could be transmitted utilizing multiple circuitry. Each field would have unique data characteristics.

For the encoded data field of FIG. 5, a second encoded data field would have unique encoded data by adding a second circuit which would transmit different encoded data, 25, through the same or separate optics, 26. The receiving collar would have circuitry included which would detect and decode the different and unique encoded energy fields, and an appropriate instructional command would be issued to the animal for each field that is detected.

For the non encoded infrared field of FIG. 8, a second infrared field of different wavelength from the first would be transmitted. This non encoded second infrared field would be a of a unique infrared wavelength from the first field. A second circuit would transmit through a different infrared emitting diode, 24, which would transmit a different infrared wavelength through the same or separate optics, 26. The receiving collar would have circuitry and optics included which would detect both of the unique infrared energy fields, and be capable of distinguishing between the two. An appropriate instructional command would be issued to the animal for each of the fields that it enters. Likewise a plurality of fields may be transmitted and received.

I claim:
1. An animal confining system comprising
  means for establishing a boundary including
    a point source of radiated energy,
    means for converting said radiated energy into a curtain of radiated energy,
    means for transmitting an encoded signal within said curtain of radiated energy, and
  a collar to be worn by an animal to be confined including
  means for issuing an instructional command,
  means for receiving said radiated energy when the animal is within said curtain of radiated energy, and
  means for decoding said encoded signal and operating said instructional command issuing means upon receipt of said decoded signal.
2. An animal confining system according to claim 1, wherein instructional command issuing means comprises means for altering the instructional command as a function of proximity to the centerplane of said curtain of radiated energy.
3. An animal confining system according to claim 1, wherein said means for converting said radiated encoded energy into a curtain of encoded radiated energy establishes a linear curtain.

4. An animal confining system according to claim 1, further comprising means for supporting said point source of encoded radiated energy above the ground.

5. An animal confining system according to claim 1, wherein said boundary establishing means comprises a plurality of spaced point sources and a corresponding number of means for converting the encoded energy radiated from an associated point source into a curtain of encoded radiated energy, and corresponding number of transmitting means for transmitting said encoded signal within each of said curtains of radiated energy.

6. An animal confining system, according to claim 1 comprising
means for establishing a second boundary adjacent said first boundary including
a point source of encoded radiated energy having a second code, and
means for converting said radiated encoded energy into a second curtain of encoded radiated energy having a second code;
means for issuing a second instructional command,
means for receiving said encoded energy having said second code when the animal is within said second curtain and converting said encoded energy signal into an encoded signal having a second code, and
means for decoding said encoded signal having said second code and operating said second instructional command means.

7. An animal confining system comprising
means for establishing a boundary including
a point source of radiated energy, and
optical means for converting said radiated energy into a curtain of radiated energy, and
a collar to be worn by an animal to be confined including
means for issuing an instructional command,
means for receiving said radiated energy when the animal is within said curtain of radiated energy, and converting said received radiated energy into a signal, and
means for operating said instructional command issuing means upon receipt of said signal.

8. An animal confining system, according to claim 7 further comprising
means for establishing a second boundary adjacent to said first boundary including
a second point source of different radiated energy, and
optical means for converting said radiated energy from a second point source into a second curtain of radiated energy, wherein said collar further comprises
means for issuing a second instructional command,
means for receiving the energy radiated from said second point source when the animal is within said second curtain and converting said energy into a second signal, and
means for operating said second instructional command means upon receipt of said second signal.

9. An animal confining system according to claim 8, wherein said optical means for converting said radiated energy from said first point source into a curtain of radiated energy comprises said optical means for converting said radiated energy from said second point source into said second curtain of radiated energy.

10. An animal confining system according to claim 8, wherein said second instructional command issuing means comprises means for altering the second instructional command as a function of proximity to the centerplane of said second curtain of radiated energy.

11. An animal confining system according to claim 7, wherein said instructional command issuing means comprises means for altering the instructional command as a function of proximity to the centerplane of said curtain of radiated energy.

* * * * *